United States Patent
Ajmera et al.

(10) Patent No.: US 11,726,957 B2
(45) Date of Patent: Aug. 15, 2023

(54) METHODS AND SYSTEMS FOR A NETWORK FLOW LOG DATABASE

(71) Applicant: Pensando Systems Inc., Milpitas, CA (US)

(72) Inventors: Shrey Ajmera, Milpitas, CA (US); Vipin Jain, San Jose, CA (US); Enrico Schiattarella, Los Altos, CA (US); Pirabhu Raman, Fremont, CA (US)

(73) Assignee: Pensando Systems Inc., Milpitas, CA (US)

( * ) Notice: Subject to any disclaimer, the term of this patent is extended or adjusted under 35 U.S.C. 154(b) by 293 days.

(21) Appl. No.: 17/225,060

(22) Filed: Apr. 7, 2021

(65) Prior Publication Data

US 2022/0335008 A1    Oct. 20, 2022

(51) Int. Cl.
*G06F 16/00* (2019.01)
*G06F 16/13* (2019.01)
*G06F 16/14* (2019.01)
*H04L 43/062* (2022.01)

(52) U.S. Cl.
CPC ............ *G06F 16/13* (2019.01); *G06F 16/148* (2019.01); *H04L 43/062* (2013.01)

(58) Field of Classification Search
CPC ........ G06F 16/13; G06F 16/14; G06F 16/148; H04L 12/26
See application file for complete search history.

(56) References Cited

U.S. PATENT DOCUMENTS

| | | | |
|---|---|---|---|
| 8,949,257 B2 | 2/2015 | Shiffer et al. | |
| 9,264,370 B1 | 2/2016 | Ahn et al. | |
| 9,667,656 B2 | 5/2017 | Banerjee et al. | |
| 10,769,126 B1* | 9/2020 | Hagerup | G06F 16/2453 |
| 2014/0366118 A1 | 12/2014 | Yin | |
| 2016/0055143 A1 | 2/2016 | Goel et al. | |
| 2016/0203174 A1* | 7/2016 | Shahane | G06F 16/2228 707/803 |
| 2016/0292171 A1* | 10/2016 | Bhagat | G06F 16/134 |
| 2017/0103094 A1* | 4/2017 | Hu | G06F 16/278 |

(Continued)

OTHER PUBLICATIONS

European Search Report and Written Opinion, EP22166911, dated Aug. 9, 2022.

(Continued)

*Primary Examiner* — Cheryl Lewis
(74) *Attorney, Agent, or Firm* — Loza & Loza, LLP

(57) ABSTRACT

Network appliances can record log entries in log objects. An object store can receive the log objects and can use the log objects to create index objects and flow log objects. Each flow log object and index object can be associated with a time period wherein the flow log object includes flow log entries received during that time period. The index object includes shard tables that can be stored in different nonvolatile memories and can thereby be concurrently searched. Shard entries in the shard tables indicate flow entry indicators. The flow entry indicators indicate log entries in the flow log object. An internally indexed searchable object can include the flow log object and the index object. Numerous indexed fields in the flow log entries and can be indexed with each indexed field searchable via the shard entries.

20 Claims, 13 Drawing Sheets

(56) References Cited

U.S. PATENT DOCUMENTS

2021/0165767 A1* 6/2021 D'Halluin ............ G06F 16/2322
2021/0232601 A1* 7/2021 Narayanan ............ H04L 43/065

OTHER PUBLICATIONS

Rosper, Dimitri, "Indexing and Searching VPC Flow Logs in IBM Cloud Databases for Elasticsearch I IBM", Retrieved from the Internet: https://www.ibm.com/cloud/blog/indexing-and-searching-vpc-flow-logs-in-ibm-cloud-databases-for-elasticsearch, (Oct. 6, 2020), 15 pgs.

Bo Andersen, "Understanding Sharding in Elasticsearch", Retrieved from the Internet: https://codingexplained.com/coding/elasticsearch/understanding-sharding-in-elasticsearch, (Aug. 8, 2017), 11 pgs.

Pryiomka, Alex et al. "lucene—Elasticsearch index sharding explanation", XP055950235, Retrieved from the Internet: https://stackoverflow.com/questions/47003336/elasticsearch-index-sharding-explanation, (Mar. 2, 2021), 6 pgs.

Anonymous, "Flow Table—Onyx V3.9.2504—NVIDIA Networking Docs", Retrieved from the Internet: https://docs.nvidia.com/networking/display/Onyxv392504/Flow+Table, (Mar. 1, 2021), 1 pg.

Wikipedia, "Object Storage", https://en.wikipedia.org/wiki/Object_storage, downloaded Sep. 15, 2021, 11 pgs.

Nicolas, Philippe, "The History Boys: Object storage . . . from the beginning; Taking you way back with content-addressable storage", Jul. 15, 2016, 5 pgs.

Leung, Andrew et al. "Spyglass: metadata search for large-scale storage systems", vol. 34, No. 3, Jun. 2009, p. 24-30.

* cited by examiner

METHODS AND SYSTEMS FOR A NETWORK FLOW LOG DATABASE

TECHNICAL FIELD

The embodiments relate to computer networks, storage area networks, ethernet, channel adapters, network interface cards, network appliances, routers, switches, load balancers, packet processing pipelines, P4 packet processing pipelines, programmable packet processing pipelines implemented using special purpose circuitry, and HPC (high performance computing).

BACKGROUND

Flow log databases store a record of network traffic processing events that occur on a computer network. For example, the network appliances providing network services for a network can create a log entry for each network packet received and for each network packet transmitted. Flow log databases in data centers can be extremely large due to the immense amount of network traffic. General purpose databases, such as Elastic or Lucene, have been used for the flow log databases in some large data centers.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented in a method. The method can include creating a flow log object that includes a plurality of log entries at a plurality of log entry locations, creating an index object that includes a plurality of shards and a flow table that indicate the log entry locations, and storing the flow log object and the index object in at least one nonvolatile memory, wherein each of the log entries includes a plurality of indexed field values for a plurality of indexed fields that include a first indexed field and a second indexed field, the log entries include a log entry stored at an entry location, a first shard entry is stored in a first one of the shards indicated by a first shard identifier determined using the first indexed field, the first shard entry stores a first flow entry indicator in association with a first flow key determined using the first indexed field, the first flow entry indicator indicates a first log entry indicator that indicates the entry location, a second shard entry is stored in a second one of the shards indicated by a second shard identifier determined using the second indexed field, the second shard entry stores a second flow entry indicator in association with a second flow key determined using the second indexed field, and the second flow entry indicator indicates a second log entry indicator that indicates the entry location.

Another aspect of the subject matter described in this disclosure can be implemented by a system comprising a nonvolatile memory, and an object store, wherein the object store is configured to store a flow log object and an index object in the nonvolatile memory, the flow log object includes a plurality of log entries at a plurality of log entry locations, the index object includes a plurality of shards and a flow table that indicate the log entry locations, each of the log entries includes a plurality of indexed field values for a plurality of indexed fields that include a first indexed field and a second indexed field, the log entries include a log entry stored at an entry location, a first shard entry is stored in a first one of the shards indicated by a first shard identifier determined using the first indexed field, the first shard entry stores a first flow entry indicator in association with a first flow key determined using the first indexed field, the first flow entry indicator indicates a first log entry indicator that indicates the entry location, a second shard entry is stored in a second one of the shards indicated by a second shard identifier determined using the second indexed field, the second shard entry stores a second flow entry indicator in association with a second flow key determined using the second indexed field, and the second flow entry indicator indicates a second log entry indicator that indicates the entry location.

Yet another aspect of the subject matter described in this disclosure can be implemented by a system comprising a flow log means storing a plurality of flow log entries, an indexing means configured for locating the flow log entries in the flow log means, an internally indexed means that includes the indexing means and the flow log entries, and a means for sharding within the indexing means. In some implementations of the methods and devices, the system includes a series means associating the flow log means and the indexing means with a time period.

In some implementations of the methods and devices, the flow log object and the index object are included in a searchable object that is internally indexed and that is stored in the at least one nonvolatile memory. In some implementations of the methods and devices, the searchable object is stored in a file wherein a flow log footer is stored after the index object which is stored after the flow log object, which is stored after a flow log header. In some implementations of the methods and devices, the flow table includes a plurality of log entry indicators that contain log entry offsets and log entry sizes that indicate the log entry locations within the file. In some implementations of the methods and devices, the index object includes a shards table that includes a plurality of shard table entries, the shards table entries associate a plurality of shard identifiers with a plurality of shard indicators, and each of the shard indicators indicate a shard location and a shard length. In some implementations of the methods and devices, the shards stored in the at least one nonvolatile memory are concurrently searchable.

In some implementations of the methods and devices, the method includes receiving a plurality of log objects that contain the log entries, storing the log entries into a memory flow log object at a plurality of memory locations, storing a plurality of memory flow entry indicators in a plurality of memory shards, transferring the log entries from the memory flow log object into the flow log object, and transferring the memory shards into the shards. In some implementations of the methods and devices, the memory shards are stored in a volatile memory. In some implementations of the methods and devices, the shards stored in the at least one nonvolatile memory and the memory shards are concurrently searchable.

In some implementations of the methods and devices, an object store receives the log objects from a plurality of network appliances, the log entries are records of a plurality of network traffic flows processed by the network appliances, receiving one of the log objects triggers an intake process, the intake process stores the log entries in the memory flow log object, the intake process stores the memory flow entry indicators in the memory shards, and the flow log object is produced from log entries received during a predefined time period or from a predetermined number of log entries received during the predefined time period. In some implementations of the methods and devices, the method includes receiving a query request that includes a query value for one of the indexed fields, using the query value to identify a query memory shard and a query shard, determining a query flow key from the query value, using the query flow key to search the query shard and the query memory shard for the log entries matching the query request, and returning a query response that includes a matching log entry.

In some implementations of the methods and devices, a plurality of flow log objects are sequentially produced during a plurality of flow log periods, a series object is associated with one of a plurality of sequentially occurring series periods, the series object includes a plurality of flow log indicators that indicate the flow log objects produced during the one of the series periods, the flow log object is one of the flow log objects produced during the one of the series periods, and the series object is one of a plurality of series objects uniquely associated with the series periods. In some implementations of the methods and devices, the flow log object and the index object are included in a searchable object that is internally indexed and that is stored in the nonvolatile memory, the searchable object is stored in a file wherein a flow log footer is stored after the index object which is stored after the flow log object, which is stored after a flow log header, and the flow table includes a plurality of log entry indicators that contain log entry offsets and log entry sizes that indicate the log entry locations within the file.

In some implementations of the methods and devices, the index object includes a shards table that includes a plurality of shard table entries, the shards table entries associate a plurality of shard identifiers with a plurality of shard indicators, each of the shard indicators indicate a shard location and a shard length, and the shards are concurrently searchable. In some implementations of the methods and devices, the system is configured for receiving a plurality of log objects that contain the log entries, the system is configured for storing the log entries into a memory flow log object at a plurality of memory locations, the system is configured for storing a plurality of memory flow entry indicators in a plurality of memory shards, the system is configured for transferring the log entries from the memory flow log object into the flow log object, and the system is configured for transferring the memory shards into the shards.

In some implementations of the methods and devices, the object store receives the log objects from a plurality of network appliances, the log entries are records of a plurality of network traffic flows processed by the network appliances, receiving one of the log objects triggers an intake process, the intake process stores the log entries in the memory flow log object, the intake process stores the memory flow entry indicators in the memory shards, and the flow log object is produced from log entries received during a predefined time period or from a predetermined number of log entries received during the predefined time period. In some implementations of the methods and devices, a plurality of flow log objects are sequentially produced during a plurality of flow log periods, a series object is associated with a series period that is one of a plurality of sequentially occurring series periods, the series object includes a plurality of flow log indicators that indicate the flow log objects produced during the series period, the flow log object is one of the flow log objects produced during the series period, and the series object is one of a plurality of series objects uniquely associated with the series periods.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

Throughout the description, similar reference numbers may be used to identify similar elements.

DETAILED DESCRIPTION

Figure 1:
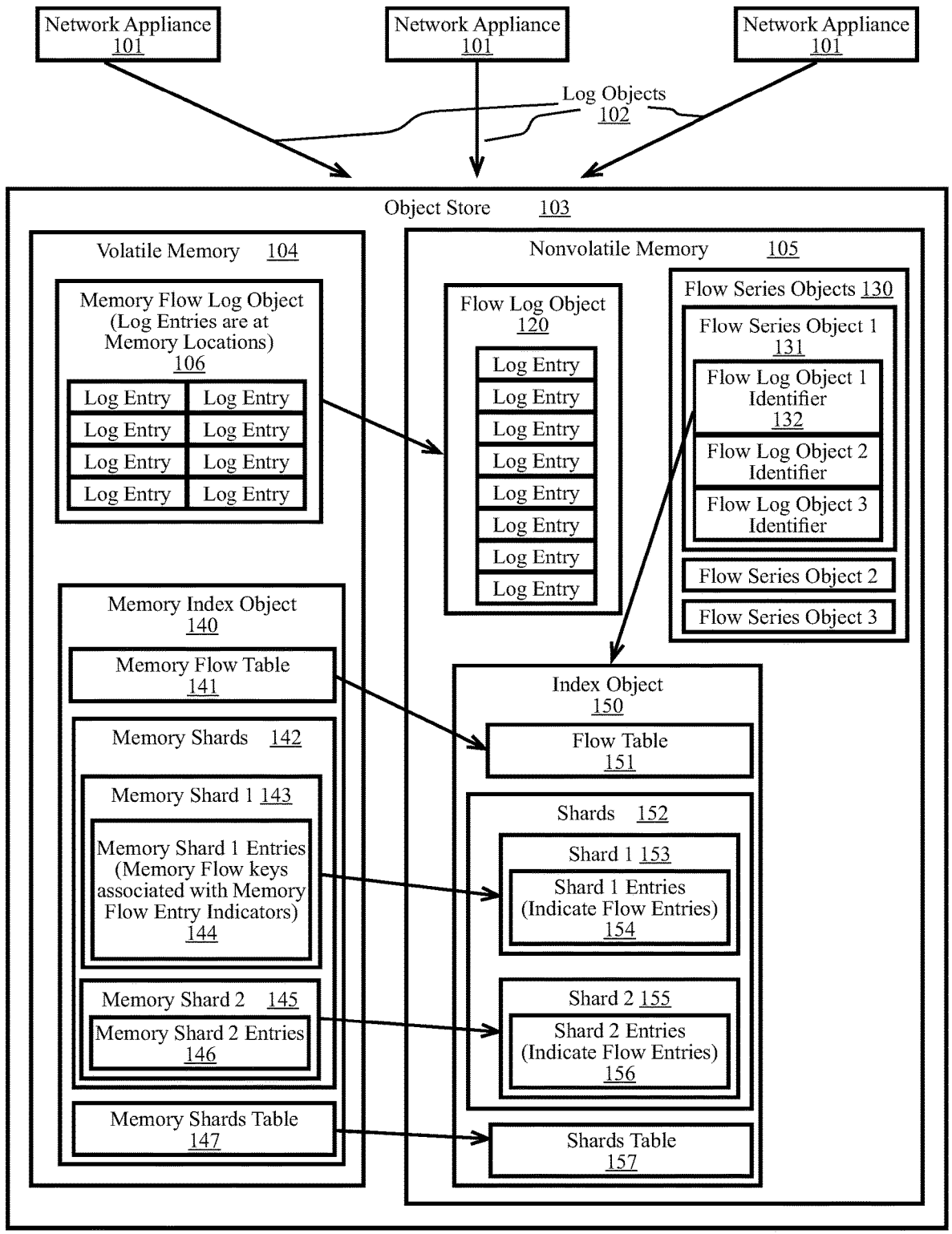
FIG. 1 is a functional block diagram illustrating an object store receiving and processing log objects according to some aspects.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Network traffic flow logs have proven useful in monitoring computer networks, detecting network traffic patterns, detecting anomalies such as compromised (hacked) systems, and for other purposes. Network traffic, however, is increasing. Data centers in particular have enormous amounts of network traffic. Per device flow logs have been collected, processed and stored in general purpose data stores such as Elastic and Lucene. Elasticsearch, based on the Lucene library, provides a distributed, multitenant-capable full-text search engine with a hypertext transport protocol (HTTP) web interface and schema-free java script object notation (JSON) documents. As such, the per device flow logs can be translated into JSON documents and stored. Lucene and Elastic are powerful. They are also general purpose and require massive amounts of storage and processing when storing and searching massive databases. Logging network traffic flows generates massive amounts of data. A more specialized data store has been developed that more efficiently provides searchable logs of network traffic.

The data store can center on an object store. Object stores are often used for data storage applications. Network appliances such as routers, switches, and network interface cards (NICs) can record log entries for a predetermined time period, until available logging storage fills, etc. The log entries can be comma-separated variable (CSV) files with each line being a CSV list of data fields such as source IP, destination IP, etc. The object store can receive the CSV files and process them to produce index objects and flow log objects. The data stored in object store can be in a highly compressed format. Object data and flow log data stored in memory shards can be also be stored in a compressed form optimized for concurrent reading and writing. The compression techniques used for memory shards and on-disk shards can be different depending on the decompression speed needed for searching. The flow log objects can store the log entries while the index object contains tables that can be used for finding specific log entries based on indexed fields of the log entries. The object data store being distributed, the index object can be sharded such that some tables can be searched in parallel. In some embodiments, the index object and the flow log object are contained in a self-indexed searchable object. A file format, disclosed herein, for self-indexed searchable objects is provided that can be rapidly searched, particularly when the object store keeps different parts of the index in different shards. The self-indexed searchable object has been optimized for the specific use case of storing and searching for log entries of network traffic flows.

One advantage is that the data being added to the data store can be added as append only data because neither the index nor the log entries should be modified once stored. This increases the efficiency with which the data can be stored and accessed because the data modification use case does not need to be handled. Another advantage is that the data can be stored in a compact format because the data is not rearranged after being written. For example, the well-known Protobuf utility may be used to serialize and compress the data in the flow log object or in the index object. The index is designed with shards such that only the desired shard must be read from the object store. Another advantage is that searches fail fast because the indexes quickly reveal if the data matching a search query exists. Yet another advantage is the self-indexed searchable object can be stored as flat files with index data and log entries read via read instructions using file offsets and read lengths. Such a mechanism is faster and more efficient than two-layer approaches such as Lucene and Elastic.

The embodiments can have further advantages, as detailed in the following table:

| Embodiments Implementing Network Flow Log Database | Generic Purpose Reverse Indexer |
|---|---|
| The in-memory and on disk index and flow structs are designed for achieving best efficiency specifically for the flow logs use case. The structs are optimized for the flow logs use case and can be stored in binary format, thereby greatly | Designed for supporting many use cases which may result in comparatively slower ingestion and search performance for some use cases for a given amount of CPU and memory resources. |

| Embodiments Implementing Network Flow Log Database | Generic Purpose Reverse Indexer |
|---|---|
| improving scalability while requiring fewer CPU and memory resources. Can use a specialized flat file format, discussed below, as the database and can replicate database files for resiliency. | Stores data in two layers, flat file and another lower-level database like Lucene for Elastic. As such, the data must be moved around on the disk. |
| Ingests data by directly converting CSV format into binary format. It can use Protobuf format for efficiently serializing index and logs structs. | Ingests data in JSON/XML format, which adds extra serialization and deserialization overhead. Also serialized JSON and XML are much bigger in size than serialized binary format, hence resulting in sending more data on the wire. Key value stores like BoltDB can be used for storing data in binary format, but they do not provide the advanced search functionality needed for flow logs. |
| The database can be an append only database wherein the data cannot be mutated after creation. This assumption holds true for flow logs and helps in the following ways: 1. Avoids creation of reverse index from doc-id to the document. 2. The data and index files can be stored in highly compact format because there is no rearrangement needed once written. | Supports modification/deletion of documents. |
| Can perform bulk ingestion transactions. Index and the corresponding flows are written to the disk in bulk. E.g., they are written on the disk once every 10 mins or 6 Million flows, whichever happens first | Performs smaller ingestion transactions resulting in various overheads such as network overhead, disk write overhead etc. |
| Performs bulk replication, resulting from bulk ingestion transactions | Performs smaller replication transactions, resulting from smaller ingestion transactions |
| The search subsystem can take advantage of the specialized flat file format for performing highly efficient search operations: 1. The index is sharded, as such, there is no need to load the whole index for searching. Only the shard needed for the query may be read. 2. A search fails fast if the index does not have an entry for the searched parameters. 3. It reads and deserializes only the minimal data that is needed for the search query i.e., it does not read and deserialize all the flow records that are present in the file for comparing them against the search query. It will read and deserialize only the ones that match the searched query parameters. | The select SQL search functionality provided by object stores (Amazon S3 and Minio) only works for CSV, JSON and Apache Parquet. For the CSV & JSON format, the SQL search has to read every line from the CSV file and match it against the given SQL expression. The performance is linear to the number of logs in the CSV/JSON file. Moreover, even when nothing matches, the whole CSV file must be read. |
| Data lifecycle: very granular lifecycle operations can be performed on the data without losing efficiency. E.g., when flow files are created 10 minutes apart and the life cycle is set to 24 hours, only one file may be deleted every 10 minutes due aging out. | Data lifecycle: In ElasticSearch, the lifecycle operations are performed based on the properties of the index such as the index creation time instead of creation time of the logs. This is an issue when to some other behavior is desired. Work arounds may be possible such as: 1. Create small indices such as per hour indices. However, creating more indices leads to inefficiency in the cluster. 2. Search the documents and then delete based on search result. Searching adds extra overhead. |

Network connection flows are flows that can logged as log entries in a flow log object. The contents of a log entry can describe a network connection flow. For example, the fields in a log entry can include: source virtual routing and forwarding (svrf), destination virtual routing and forwarding (dvrf), source IP address (sip), destination IP address (dip), timestamp, source port (sport), destination port (dport), protocol, action, direction, rule identifier (ruleid), session identifier (sessionid), session state, ICMP type (icmptype), ICMP identifier (icmpid), ICMP code (icmpcode), application identifier (appid), forward flow bytes (iflowbytes), and reverse flow bytes (rflowbytes). A log entry can be a comma separated variable (CSV) list of the fields. The definition of the log entry can be the order of the fields in the CSV list. For example, the definition can be {svrf, dvrf, sip, dip, sport, dport, protocol, action, direction, ruleid, sessionid, session state, icmptype, icmpid, icmpcode, appid, iflowbytes, rflowbytes}. A log entry based on the foregoing definition could be {65, 65, 10.0.1.5, 192.168.5.50, 100, 100, TCP, allow, from-host, 1000, 1000, dummy, 1, 1, 1, 100, 1050, 124578}.

FIG. 1 is a functional block diagram illustrating an object store 103 receiving and processing log objects 102 according to some aspects. Network appliances 101 are receiving and forwarding network packets. The network appliances 101 save log entries for the network packets in the log objects 102, which can each contain thousands of log entries. The object store can have a volatile memory 104 and a nonvolatile memory 105. Examples of volatile memory include synchronous dynamic random-access memory (SDRAM) such as double data rate 4 (DDR4) SDRAM and double data rate 5 (DDR5) SDRAM. Examples of nonvolatile memory include hard disk drives, and solid-state drives. Some embodiments may have an object store That is used only for storing the flow log objects, index objects and the log objects reported by the network devices. The processing needed for creating the flow log objects, creating index objects, and performing searches can be performed by a separate service. The separate service can use the object store for storing objects and other data.

In-memory data can be stored in volatile memory 104 while persistent data can be stored in nonvolatile memory. The in-memory data can include a memory flow log object 106 and a memory index object 140. The memory flow log object 106 can include log entries. The memory index object can include a memory flow table 141, memory shards 142, and a memory shards table 147. The memory shards 142 can include a first memory shard 143, and a second memory shard 145. The first memory shard 143 can include first memory shard entries 144. The second memory shard 145 can include second memory shard entries 146. The memory shard entries 144, 146 can be flow keys stored in association with memory flow entry indicators. In some embodiments, the flow keys and the memory flow entry indicators are stored as the key-value pairs of a key value data store.

The memory shards table 147 can indicate the locations of the memory shards 142. The number of shards is predetermined and may be application specific. For example, an embodiment may have 64 memory shards. As such, the memory shards table 147 can be a list of 64 addresses, offsets, or other location indicators. Each location indicator in the memory shards table indicates the location of a memory shard.

An intake process can be triggered when a log object is received. The intake process can process the log entries in the log object by storing the log entries in the memory flow log object 106 and by creating index data stored in the memory index object 140. The index data can include flow entries stored in the memory flow table 141 and memory shard entries. The data in the volatile memory 104 can be transferred to the nonvolatile memory 105 at regular intervals, when a timer expires, or when a threshold number of log entries are stored in the memory flow log object 106. The data in the nonvolatile memory can include flow log object 120, flow series objects 130, and an index object 150. The index object 150 can include a flow table 151, shards 152, and a shards table 157. The shards 152 can include a first shard 153 and a second shard 155. Here, two shards are used in order to explain aspects of the embodiments. It is understood that in practice more shards can be used. Embodiments having sixty-three shards have been tested.

The log entries in the memory flow log object 106 can be moved into the flow log object 120. The log entries can be compressed using any of the well-known data compression algorithms. The first shard 153 can include first shard entries 154. The second shard 155 can include second shard entries 156. The shard entries 154, 156 can include flow keys stored in association with flow entry indicators. In some embodiments, the flow keys and the flow entry indicators are stored as the key-value pairs of a key value data store.

The shards table 157 can indicate the locations of the shards 152. The number of shards can be the same as the number of memory shards. For example, an embodiment may have 64 memory shards and 64 shards. As such, the shards table 157 can be a list of 64 addresses, offsets, or other location indicators. Each location indicator in the shards table indicates the location of a shard.

Flow series objects 130 can also be stored in the nonvolatile memory 105. Flow series objects 130 can include a first flow series object 131, a second flow series object, a third flow series object, and many more flow series objects. The flow series objects 130 record which of the flow log objects and index objects were created during specific time periods. For example, the first flow series object 131 may be associated with the time interval from 1AM to 2AM GMT on Dec. 7, 2020. As such, the first flow series object 131 can be a list of flow log object identifiers that includes a first flow log object identifier 132, a second flow log object identifier, a third flow log object identifier, and many more flow log object identifiers for flow log objects created between 1AM and 2AM GMT on Dec. 7, 2020. The first flow log object identifier is illustrated as indicating the index object 150. In some embodiments, a single file, called a flow file, is an internally indexed searchable object that includes the flow log object and the index object. In such embodiments, the flow series objects can be files, called series files, that include a list of file names of flow files. As each new flow file is created, its file name can be appended to the currently open series file. Furthering the example, the currently open series file can be closed at the end of every hour and a new one opened such that each series file is associated with a specific one hour time period and includes the file names of flow files created during that specific one hour time period.

Figure 2:
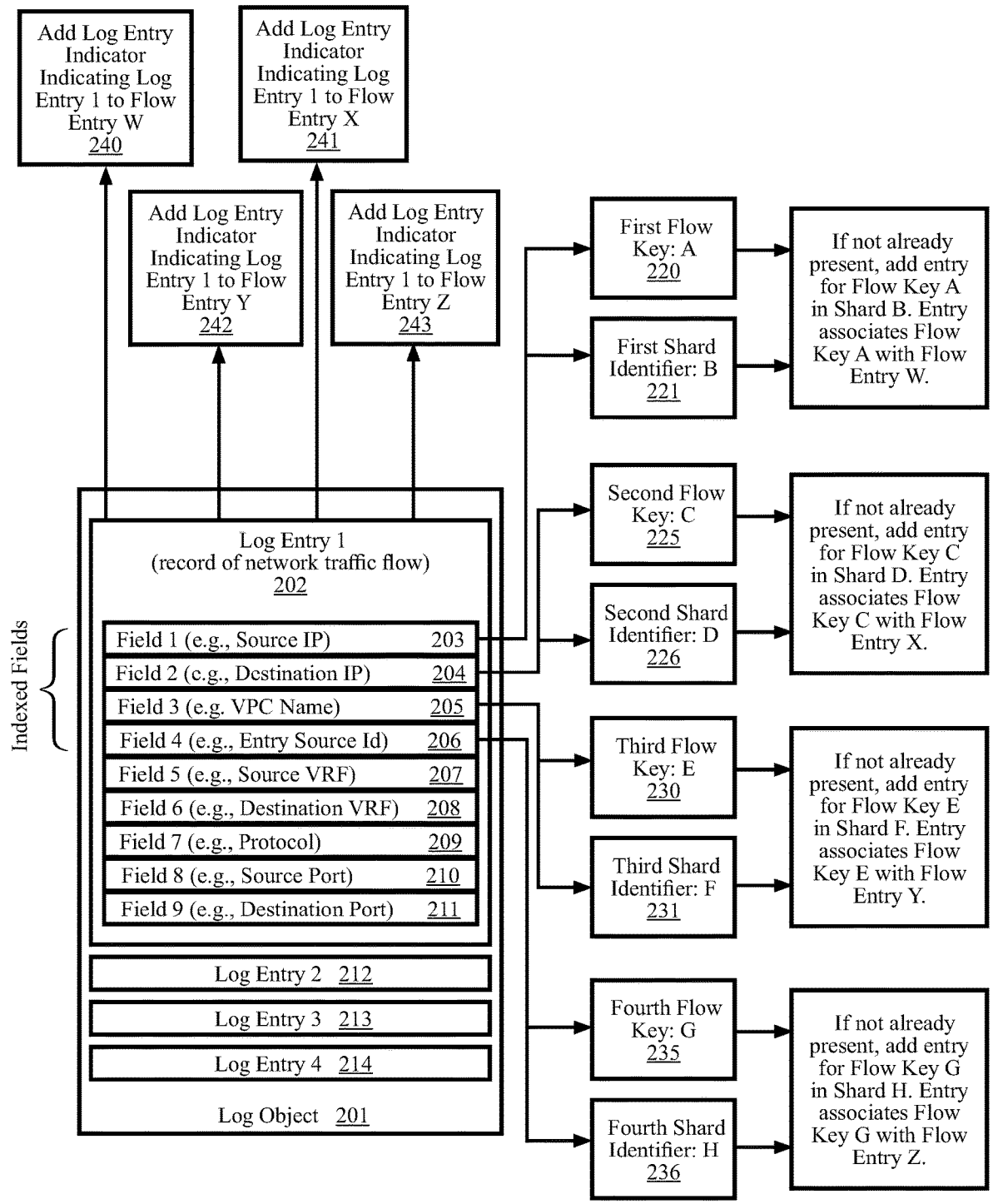
FIG. 2 is a high-level diagram illustrating processing of a log object according to some aspects.

FIG. 2 is a high-level diagram illustrating processing of a log object 201 according to some aspects. The log object 201 includes log entries such as a first log entry 202, a second log entry 212, a third log entry 213, and a fourth log entry 214. The log object can be a CSV file and each of the log entries can be a line in the file and can contain a CSV list of field values. In some embodiments, the first line of the file is a CSV list of field names. Those practiced in processing computer data are familiar with CSV files. The first log entry 202 is illustrated as a flow log entry generated by a network appliance. The first flow log entry 202 includes data fields such as a first field 203, a second field 204, a third field 205, a fourth field 206, a fifth field 207, a sixth field 208, a seventh field 209, an eighth field 210, and a ninth field 211. The first field 203 can contain a value indicating the source IP address of a network packet. The second field 204 can contain a value indicating the destination IP address of the network packet. The third field 205 can contain a value indicating the virtual private cloud tag of the network packet. The fourth field 206 can contain a value indicating the entry source Id of the network packet. The fifth field 207 can contain a value indicating the source virtual routing and forwarding (VRF) identifier of the network packet. The sixth field 208 can contain a value indicating destination VRF identifier of the network packet. The seventh field 209 can contain a value indicating the protocol (e.g., layer 4 protocol) of the network packet. The eighth field 210 can contain a value indicating the source port of the network packet. The ninth field 211 can contain a value indicating the destination port of the network packet.

Some of the data fields are indexed fields that include indexed field values. FIG. 2 shows that the indexed fields are the first field 203, the second field 204, the third field 205, and the fourth field 206. In a non-limiting example, the first field is an indexed field containing the indexed field value 192.168.1.1 while the second field is an indexed field containing the indexed field value 10.0.0.1. Each of the indexed fields can be used to determine a shard identifier and a flow key. Flow keys, shard identifiers, and other values may be determined via a hashing algorithm (e.g., CRC 32), via a lookup table, or using some other technique. Note: a modulo 64 operation can produce a shard identifier in the range 0-63.

The first log entry 202 can be added (e.g., appended) to the flow object. As such, the first log entry's location is known. For the first field value, a log entry indicator indicating the first log entry's location is added to flow entry "W" in the flow table 240. The first field value 203 can be used to determine flow key "A" 220, and shard identifier "B" 221. If not already present, an entry for flow key "A" can be added to shard "B". The shard entry associates flow key "A" with flow entry "W". For the second field value, a log entry indicator indicating the first log entry's location is added to flow entry "X" in the flow table 241. The second field value 204 can be used to determine flow key "C" 225, and shard identifier "D" 226. If not already present, an entry for flow key "C" can be added to shard "D". The shard entry associates flow key "C" with flow entry "X". For the third field value, a log entry indicator indicating the first log entry's location is added to flow entry "Y" in the flow table 242. The third field value 205 can be used to determine flow key "E" 230, and shard identifier "F" 231. If not already present, an entry for flow key "E" can be added to shard "F". The shard entry associates flow key "E" with flow entry "Y". For the fourth field value, a log entry indicator indicating the first log entry's location is added to flow entry "Z" in the flow table 243. The fourth field value 206 can be used to determine flow key "G" 235, and shard identifier "H" 236. If not already present, an entry for flow key "G" can be added to shard "H". The shard entry associates flow key "G" with flow entry "Z".

FIG. 2 illustrates an example having four indexed fields. It is understood that in practice more or fewer indexed fields may be used. Another example, that has been under test, has the following indexed fields: source IP, destination IP, the dyad<source IP, destination IP>, network appliance identifier, virtual private cloud name, source port, destination port, and protocol.

Figure 3:
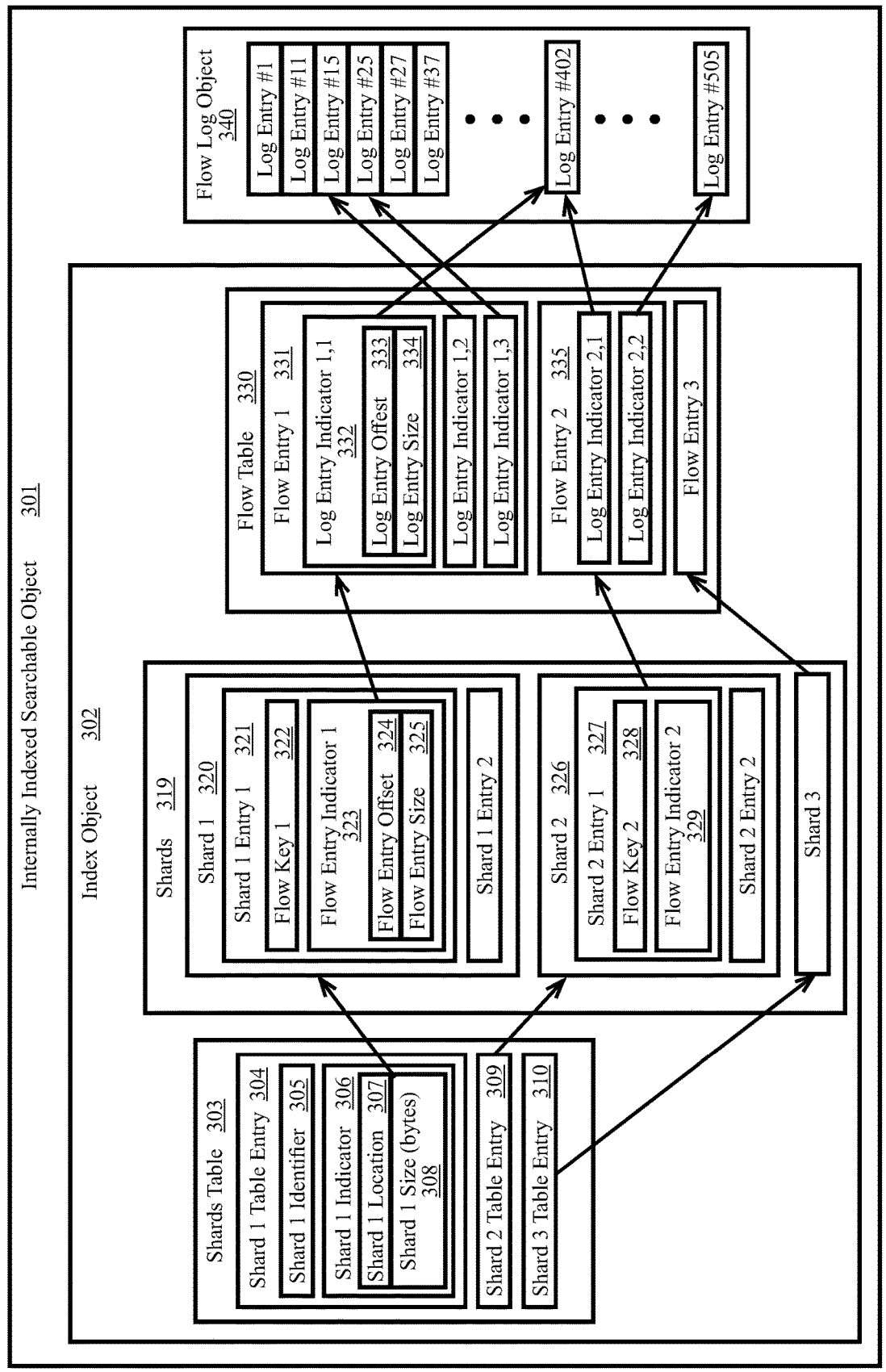
FIG. 3 is a high-level block diagram illustrating an internally indexed searchable object according to some aspects.

FIG. 3 is a high-level block diagram illustrating an internally indexed searchable object 301 according to some aspects. The internally indexed searchable object 301 includes an index object 302 and a flow log object 340. The flow log object includes log entries such as the first log entry 202 illustrated in FIG. 2. The index object 302 includes a shards table 303, shards 319, and a flow table 330. The shards table 303 includes shard table entries such as a first shard table entry 304, a second shard table entry 309, and a third shard table entry 310. The shard table entries store shard indicators, such as the first shard indicator 306, that can indicate the location and size of individual shards. The first shard indicator 306 can include a first shard location 307 and a first shard size 308. An indicator that includes a location and a size can be used for reading the indicated item directly from a memory or a file without searching. The shard indicators may be stored in association with shard identifiers. For example, the first shard indicator 306 may be stored in association with a first shard identifier 305. Embodiments using shard identifiers numbered, for example, from 0 to 63 may simply store the shard indicator for shard N at location N in the table.

Shards 319 includes shards such as a first shard 320, a second shard 326, and a third shard. The shards 319 include shard entries that store flow entry indicators in association with flow keys. The flow entry indicators can indicate the location and size of flow entries in the flow table 330. The first shard's first entry 321 stores a first flow entry indicator 323 in association with a first flow key 322. The second shard's first entry 327 stores a second flow entry indicator 329 in association with a second flow key 328. The first flow entry indicator 323 can include a flow entry offset 324 and a flow entry size 325 that can be used for reading a flow entry from a memory or file. The first flow entry indicator 323 is shown indicating a first flow entry 331. The second flow entry indicator 329 is shown indicating a second flow entry 335.

The flow table 330 includes flow entries such as the first flow entry 331 and the second flow entry 335. The flow entries can indicate log entries in the flow log object 340. The first flow entry 331 includes log entry indicator 1,1 332, log entry indicator 1,2, and log entry indicator 1,3. Log entry indicator 1,1 332 includes a log entry offset 333 and a log entry size 334. The second flow entry 335 includes log entry indicator 2,1, and log entry indicator 2,2. Log entry indicator 1,1 and log entry indicator 2,1 are shown indicating the same log entry.

Figure 4:
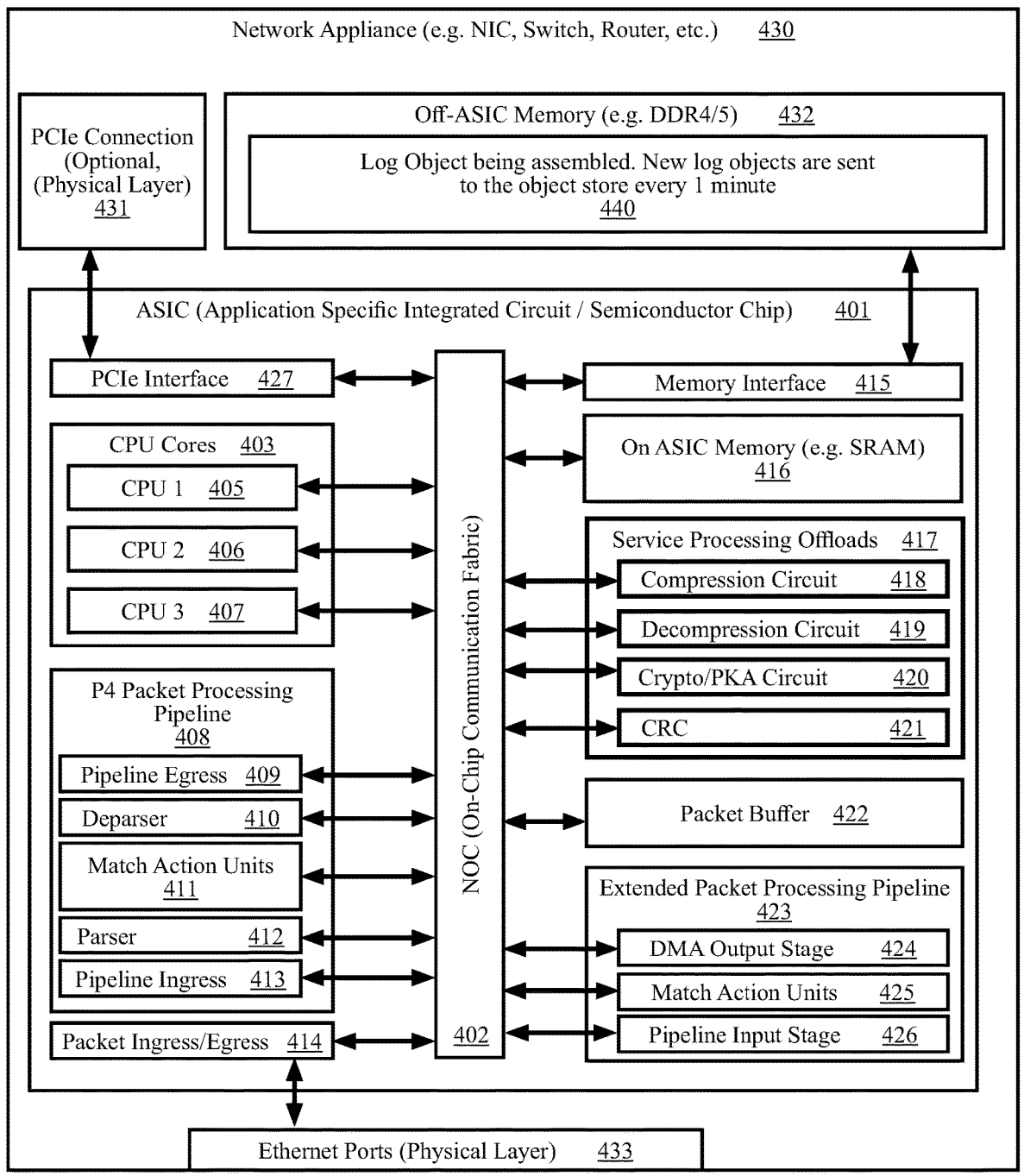
FIG. 4 is a functional block diagram of a network appliance such as a network interface card (NIC) or a network switch having an application specific integrated circuit (ASIC), according to some aspects.

FIG. 4 is a functional block diagram of a network appliance 430 such as a network interface card (NIC) or a network switch having an application specific integrated circuit (ASIC) 401, according to some aspects. A network appliance that is a NIC includes a PCIe connection 431 and can be installed in a host computer. A NIC can provide network services to the host computer and to virtual machines (VMs) running on the host computer. The network appliance 430 includes an off-ASIC memory 432, and ethernet ports 433. The off-ASIC memory 432 can be one of the widely available memory modules or chips such as DDR4 SDRAM modules such that the ASIC has access to many gigabytes of memory. The ethernet ports 433 provide physical connectivity to a computer network such as the internet.

The ASIC 401 is a semiconductor chip having many core circuits interconnected by an on-chip communications fabric, sometimes called a network on a chip (NOC) 402. NOCs are often implementations of standardized communications fabrics such as the widely used AXI bus. The ASIC's core circuits can include a PCIe interface 427, CPU cores 403, P4 packet processing pipeline 408 elements, memory interface 415, on ASIC memory (e.g., SRAM) 416, service processing offloads 417, a packet buffer 422, extended packet processing pipeline 423, and packet ingress/egress circuits 414. A PCIe interface 427 can be used to communicate with a host computer via the PCIe connection 431. The CPU cores 403 can include numerous CPU cores such as CPU 1 405, CPU 2 406, and CPU 3 407. The P4 packet processing pipeline 408 can include a pipeline ingress circuit 413, a parser circuit 412, match-action units 411, a deparser circuit 410, and a pipeline egress circuit 409. The service processing offloads 417 are circuits implementing functions that the ASIC uses so often that the designer has chosen to provide hardware for offloading those functions from the CPUs. The service processing offloads can include a compression circuit 418, decompression circuit 419, a crypto/PKA circuit 420, and a CRC calculation circuit 421. The specific core circuits implemented within the non-limiting example of ASIC 401 have been selected such that the ASIC implements many, perhaps all, of the functionality of an InfiniBand channel adapter, of an NVMe card, and of a network appliance that processes network traffic flows carried by IP (internet protocol) packets.

The P4 packet processing pipeline 408 is a specialized set of elements for processing network packets such as IP packets, NVMe protocol data units (PDUs), and InfiniBand PDUs. The P4 pipeline can be configured using a domain-specific language. The concept of a domain-specific language for programming protocol-independent packet processors, known simply as "P4," has developed as a way to provide some flexibility at the data plane of a network appliance. The P4 domain-specific language for programming the data plane of network appliances is defined in the "P416 Language Specification," version 1.2.0, as published by the P4 Language Consortium on Oct. 23, 2019. P4 (also referred to herein as the "P4 specification," the "P4 language," and the "P4 program") is designed to be implementable on a large variety of targets including network switches, network routers, programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The network appliance 430 can include a memory 432 for running Linux or some other operating system. The memory 432 can also be used for assembling a log object 440. The network appliance can be viewed as having a control plane and a data plane. The control plane, sometimes called the slow data path or slow plane, can configure the data plane, sometimes called the fast data path or fast plane, to process network packets. The data plane can be configured via downloaded P4 programming and forwarding data. Once configured for a particular network traffic flow, the data plane can process the network packets for that network traffic flow at line speed and without the control plane's involvement. The data plane can also be configured to store log entries in the log object 440 to thereby create a log of the packets that have been processed.

A well configured packet processing pipeline can store log entries while processing network packets at line speed. As such, the log object can get very large very quickly. The network appliance can therefore, at regular intervals, create a new log object to hold new log entries, and can free up the memory used by the previous log object after sending the previous log object to an object store.

The CPU cores 403 can be general purpose processor cores, such as ARM processor cores, MIPS processor cores, and/or x86 processor cores, as is known in the field. Each CPU core can include a memory interface, an ALU, a register bank, an instruction fetch unit, and an instruction decoder, which are configured to execute instructions independently of the other CPU cores. The CPU cores may be Reduced Instruction Set Computers (RISC) CPU cores that are programmable using a general-purpose programming language such as C.

The CPU cores 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 403 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniB and channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the network interfaces 433 to packet processing elements of the data plane and vice-versa. The packet processing elements can include a slow data path implemented in software and a fast data path implemented by packet processing circuitry 408, 423.

The packet processing circuitry 408, 423 can be a specialized circuit or part of a specialized circuit using one or more ASICs or FPGAs to implement programmable packet processing pipelines. Some embodiments include ASICs or FPGAs implementing a P4 pipeline as a fast data path within the network appliance. The fast data path is called the fast data path because it processes packets faster than a slow data path that can also be implemented within the network appliance. An example of a slow data path is a software implemented data path wherein the CPU cores 403 and memory 432 are configured via software to implement a slow data path.

The ASIC 401 is illustrated with a P4 packet processing pipeline 408 and an extended packet processing pipeline 423. The extended packet processing pipeline is a packet processing pipeline that has a direct memory access (DMA) output stage 424. The extended packet processing pipeline has match-action units 425 that can be arranged as a match-action pipeline. The extended packet processing pipeline has a pipeline input stage 426 that can receive packet header vectors (PHVs) or directives to perform operations. A PHV can contain data parsed from the header and body of a network packet by the parser 412.

All memory transactions in the NIC 430, including host memory transactions, on board memory transactions, and registers reads/writes may be performed via a coherent interconnect 402. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing pipeline circuits 408, 423, CPU cores 403, memory interface 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
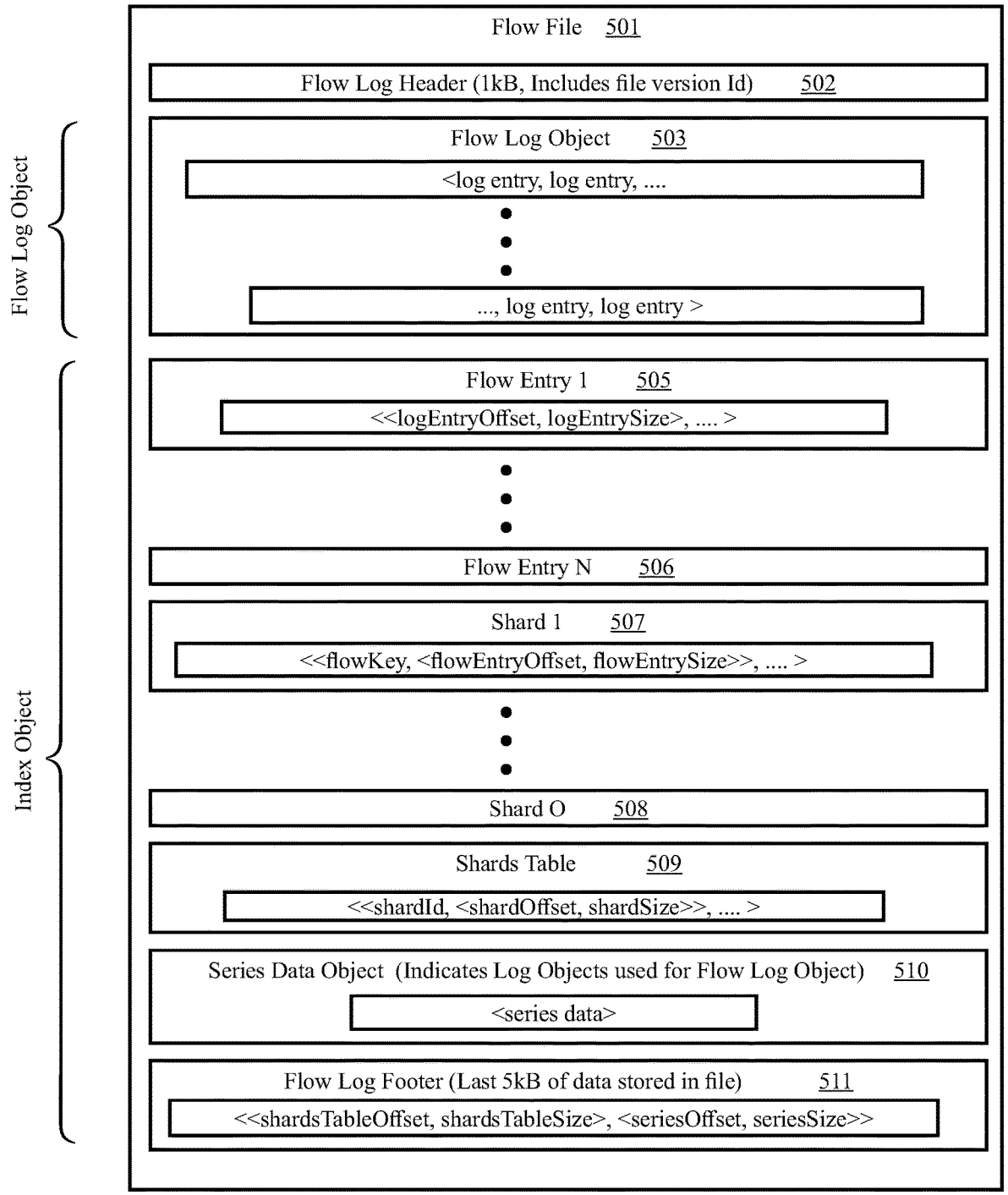
FIG. 5 illustrates a flow file that is an internally searchable object according to some aspects.

FIG. 5 illustrates a flow file 501 that is an internally searchable object according to some aspects. The flow file can be created by sequentially writing data into the file, starting with the file header 502. The file header can have a fixed size, such as 1 kB and can include a file version identifier. The file version number can be used by programs reading the file for determining if and how to read the file. The flow log object 503 can be stored immediately after the flow log header 502. The flow log object 503 can be the log entries stored one after another. As discussed, the log entries can be stored in a compressed format. The flow entries of the flow table can be stored immediately after the flow log object 503. The flow entries can be stored one after another beginning with the first flow entry 505 and ending with the last flow entry 506. A flow entry can include a number of log entry indicators. The log entry indicators can be log entry offsets paired with log entry sizes. For example, a log entry offset having the value "A" can be paired with the log entry size having the value "B". The corresponding log entry can be read from the flow file 501 by reading "B" bytes beginning at location "A" in the flow file 501. The log entries for a flow entry can be read by stepping through its log entry indicators and reading each log entry in turn.

The shards can be stored immediately after the last flow entry 506 beginning with the first shard 507 and ending with the last shard 508. The shards can be stored as key value pairs. The flowKey can be the key and the log entry indicator can be the value. The log entry indicator can be a flow entry offset and a flow entry size. For example, the flow entry offset can be the value "C" and the flow entry size can be the value "D". The corresponding flow entry can be read from the flow file 501 by reading "D" bytes beginning at location "C" in the flow file 501.

A shards table 509 can be stored immediately after the last shard 508. The shards table can begin with the first shard table entry and end with the last shard table entry. The shard table entries can include a shard offset and a shard size. For example, the shard offset can be the value "E" and the shard size can be the value "F". The corresponding shard can be read from the flow file 501 by reading "F" bytes beginning at location "E" in the flow file 501. The shards table entries can have a known size. For example, each can be eight bytes long and can include a four byte shardOffset and a four byte shardSize. As such, the Nth shard table entry can be read by reading eight bytes beginning at location (N−1)*8 in the shards table.

A series data object 510 can be stored immediately after the shards table. The flow log object 503 contains log entries from one or more specific log objects. The log objects can be stored in the object store and the series data object 510 can indicate where those specific log objects are stored. For example, the log objects can be stored, perhaps in compressed form, as CSV files within a filesystem. The series data stored in the series data object could include the fully qualified file names of each of those log objects.

The series object data can be series data that is a copy of the content stored in the series file for the time-period represented by the flow log object. The series data can be stored in both the series file and the flow file 501 for recovery purposes. For example, if the series file gets lost or gets corrupted then the series can be reconstructed by reading the series data from all the flows files.

A flow log footer 511 can be stored immediately after the series data object 510. Flow log footers can all be the same size (e.g., 5 kB) and can contain a shards table indicator and a series data object indicator. The shards table indicator can include a shards table offset and a shards table size. For example, the shards table offset can be the value "G" and the shards table size can be the value "H". The shards table can be read from the flow file 501 by reading "H" bytes beginning at location "G" in the flow file 501.

Log entries in the flow file 501 can be found quickly while reading only the necessary data from the flow file. For example, the entries matching a particular value of an indexed field can be found by determining a flow key and a shard identifier from that value of the indexed field. The flow log footer can be read by reading the tail of the file. The number of bytes to read is known because the size of the footer is known. The shards table can be read using the shards table offset and shards table size from the footer. The shard identifier is used to read, from the shards table, the shard offset and shard size of the shard having the shard identifier. The flow key is used to find a flow entry indicator in the shard. The flow entry indicator indicates a flow entry. The log entry offsets and log entry sizes in the flow entry are used to read the flow entries.

The flow file 501 is illustrated as a file that can be stored in a file system on one or more nonvolatile memory devices such as hard drives, solid state drives, etc. In some implementations, the flow file 501 can be memory mapped. A file can be memory mapped using a system call such as mmap(), which is a POSIX-compliant Unix system call that maps files or devices into volatile memory such as SDRAM. As such, the contents of the file can be accessed very quickly because the data is already in the system's SDRAM. The flow file 501 is well suited for being memory mapped because the desired data fields can be read directly from the SDRAM using known offsets. In addition, the flow file can be read only and, as such, there is additional efficiency because there is no need to synchronize writes from SDRAM to disk. For example, the flow log footer, which has a known size and position, can be accessed using its known position in the file. The flow log footer 511 gives the location of the shard table (shardsTableOffset) and the size of the shards table (shardTableSize). As such, the shards table can be accessed directly in SDRAM by accessing shardsTableSize bytes beginning at the location shardsTableOffset in the memory mapped file. Flow log objects and index objects, such as those of FIG. 3, may be memory mapped separately and distinctly by, for example, storing them in separate files and memory mapping those files. The shards table location and size parameters, (e.g., shardsTableOffset and shardsTableSize) are illustrated as located at predetermined and specified locations in the footer. The shards table location and size parameters may alternatively be located in the header or in some other location that is predetermined and specified. Furthermore, the data blocks can be ordered differently within the flow file. In fact, the technique of storing data block offsets and data block sizes can be used to intermingle the data blocks.

Figure 6:
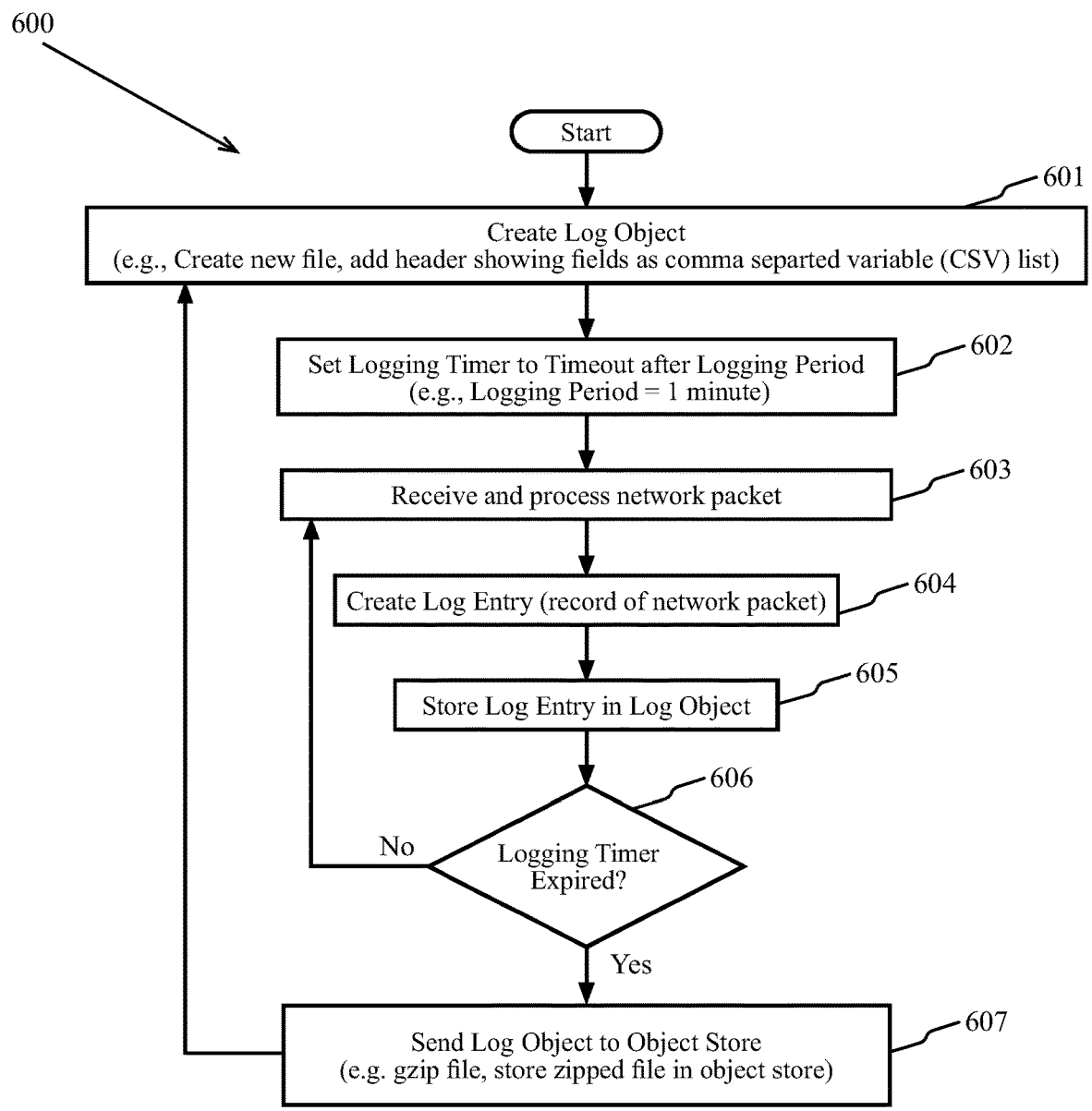
FIG. 6 is a high-level flow diagram illustrating a process that can be implemented by a network appliance to produce log objects according to some aspects.

FIG. 6 is a high-level flow diagram illustrating a process that can be implemented by a network appliance to produce log objects 600 according to some aspects. After the start, at block 601 a new log object is created. If the log object is a CSV file, then creating the log object can include creating a new file and writing in a header of field names as a CSV list. It is understood that CSV is just one of the formats may be used. Examples of other formats that may be used include Apache Parquet file format, a proprietary binary object format, etc. At block 602, a logging timer can be set. The logging timer can expire after a logging period (e.g., 1 minute) has expired. At block 603, a network packet is received and processed. At block 604, a log entry is created that is a record of the network packet that was received and processed. At block 605, the log entry is stored in the log object. At block 606, the status of the logging timer is checked. If the logging timer has not expired, the process can loop back to block 603. Otherwise, at block 607 the network appliance can send the log object to the object store before looping back to block 601. The log object sent to the object store can be a CSV file and the CSV file can be compressed. "Gzip" is a well-known file compression utility that can be used to compress the CSV file. The object store can store the log object.

Figure 7:
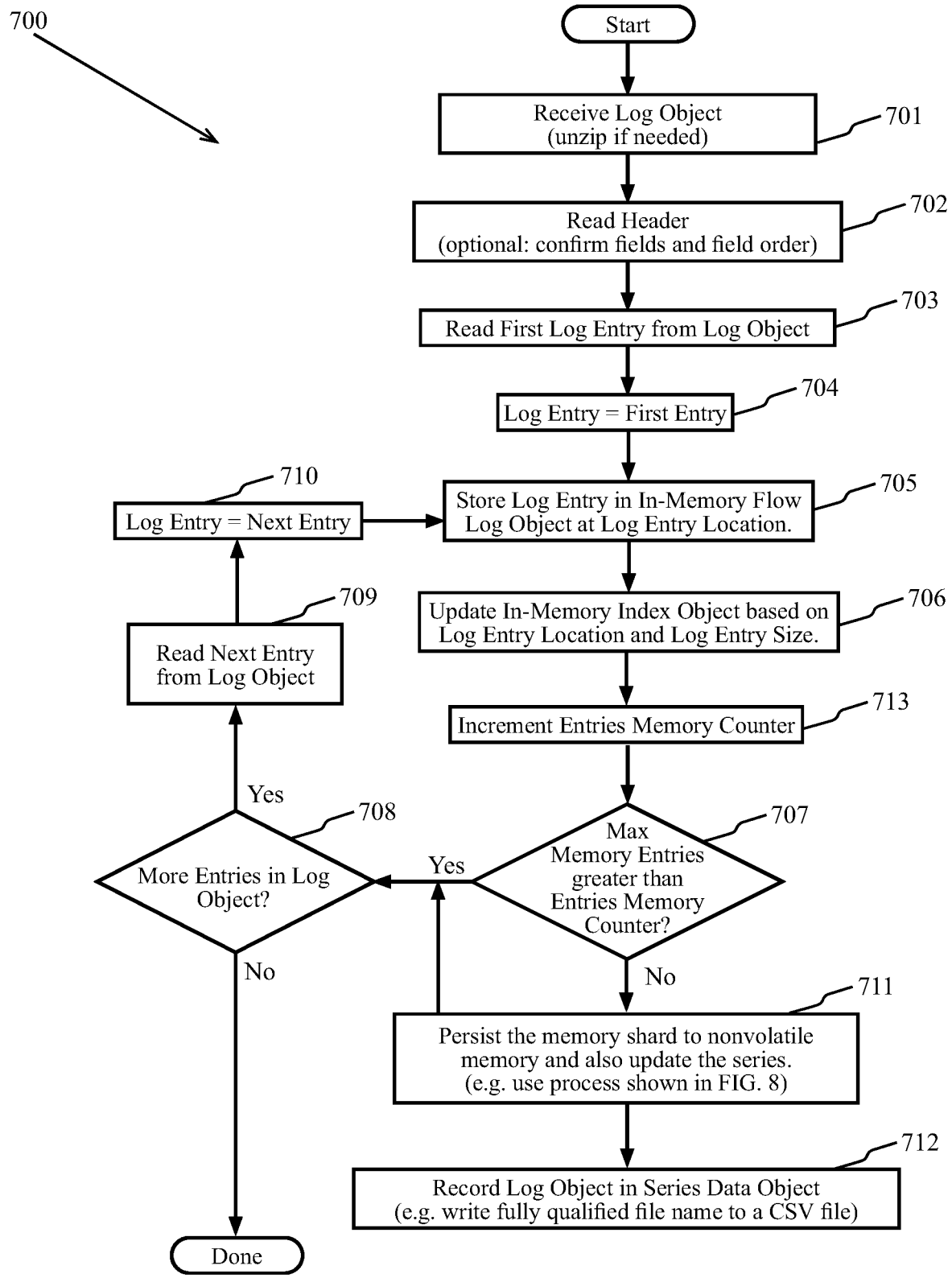
FIG. 7 is a high-level flow diagram illustrating the processing of log objects according to some aspects.

FIG. 7 is a high-level flow diagram illustrating the processing of log objects 700 according to some aspects. After the start, at block 701 the object store can receive a log object. The log object can be uncompressed if needed. At block 702, the header of the log object can be read to confirm which fields are stored in what order. At block 703, the first log entry is read from the log object. At block 704, "log entry" is set to the first log entry. At block 705, log entry is stored at "log entry location" in an in-memory flow log object such as memory flow log object 106. At block 706, the in-memory index object (e.g., memory index object 140) is updated based on the log entry location and the log entry size. At block 713, the entries memory counter is incremented. The entries memory counter can be zeroed out when the in-memory flow log object and the in-memory index object are moved to a persistent memory. At block 707, the entries memory counter is compared to a max memory entries threshold value. For example, the max memory entries threshold value can be set to 6,000,000 such that no flow log object contains more than 6,000,000 log entries.

If the max memory entries threshold value is not greater than the entries memory counter the process can proceed to block 711, otherwise it can proceed to block 708. At block 711, the process can persist the in-memory flow log object and the in-memory index object by transferring them to non-volatile memory. In some embodiments the in-memory flow log object and the in-memory index object are written into a flow file such as flow file 501. Persisting the in-memory flow log object and the in-memory index object may be accomplished via a process such as that shown in FIG. 8. At block 712, the log object is recorded in a series data object such as the first series data object 131. For example, the log object can be a CSV file and the fully qualified file name of the CSV file can be written in the series data object. At block 708 the process can check if more log entries are available in the log object. If not, the process can stop. If more log entries are available in the log object, then at block 709 the next log entry is read from the log object. At block 710, "log entry" is set to that next log entry and the process loops back to block 705.

Figure 8:
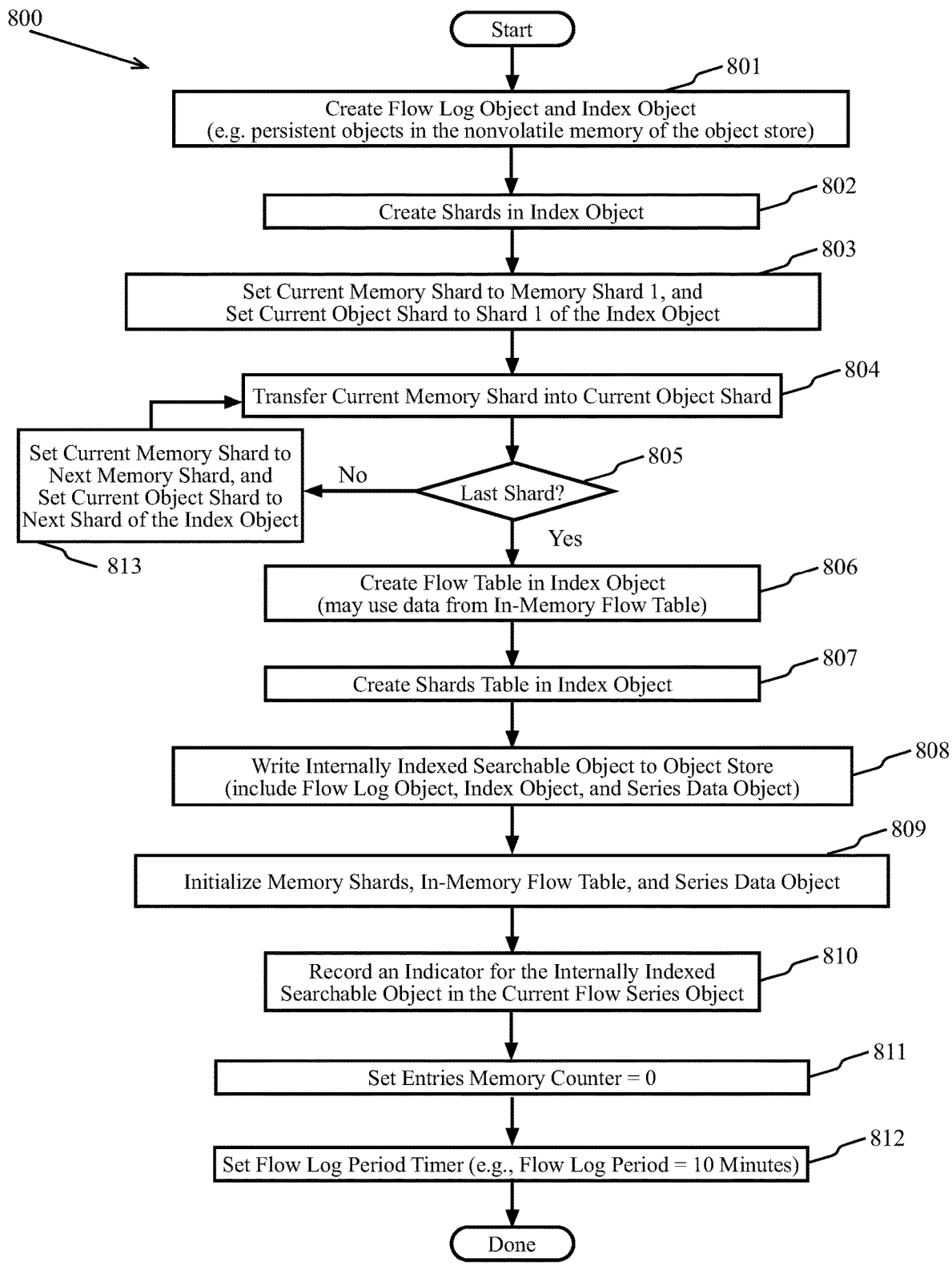
FIG. 8 is a high-level flow diagram illustrating creation of flow log objects and index objects from in-memory data structures according to some aspects.

FIG. 8 is a high-level flow diagram illustrating creation of flow log objects and index objects from in-memory data structures 800 according to some aspects. After the start, at block 801 a flow log object and an index object can be created as persistent objects in the nonvolatile memory of the object store. At block 802, shards can be created in the index object. As discussed above, the index object can have a set number of shards (e.g., 64 shards). At block 803, "current memory shard" is set to the first memory shard and "current object shard" is set to the first shard of the index object. At block 804, the current memory shard is transferred to the current object shard. At block 805, the process can check if the current shard (memory shard or index shard) is the last shard. If not, at block 813 the current memory shard is set to the next memory shard and the current object shard is set to the next shard of the index object before the process loops back to block 804. Otherwise, at block 806 a flow table can be created in the index object. The data in the in-memory flow table may be used to create the flow table. At block 807, a shards table is created in the index object. At block 808, an internally indexed searchable object can be written to the object store. The internally indexed searchable object can include the flow log object, the index object, and the series data object. At block 809, the in-memory shards, in-memory flow table, and the series data object can be initialized. At block 810, an indicator for the internally indexed searchable object can be recorded in the current flow series object. At block 811, the entries memory counter (checked at block 707) is set to 0. At block 812, the flow log period timer is set to time out after a flow log period such as 10 minutes. A 10 minute flow log period and a 6,000,000 max memory entries value can ensure that the in-memory objects are persisted every ten minutes or every six million log entries, whichever occurs first.

Figure 9:
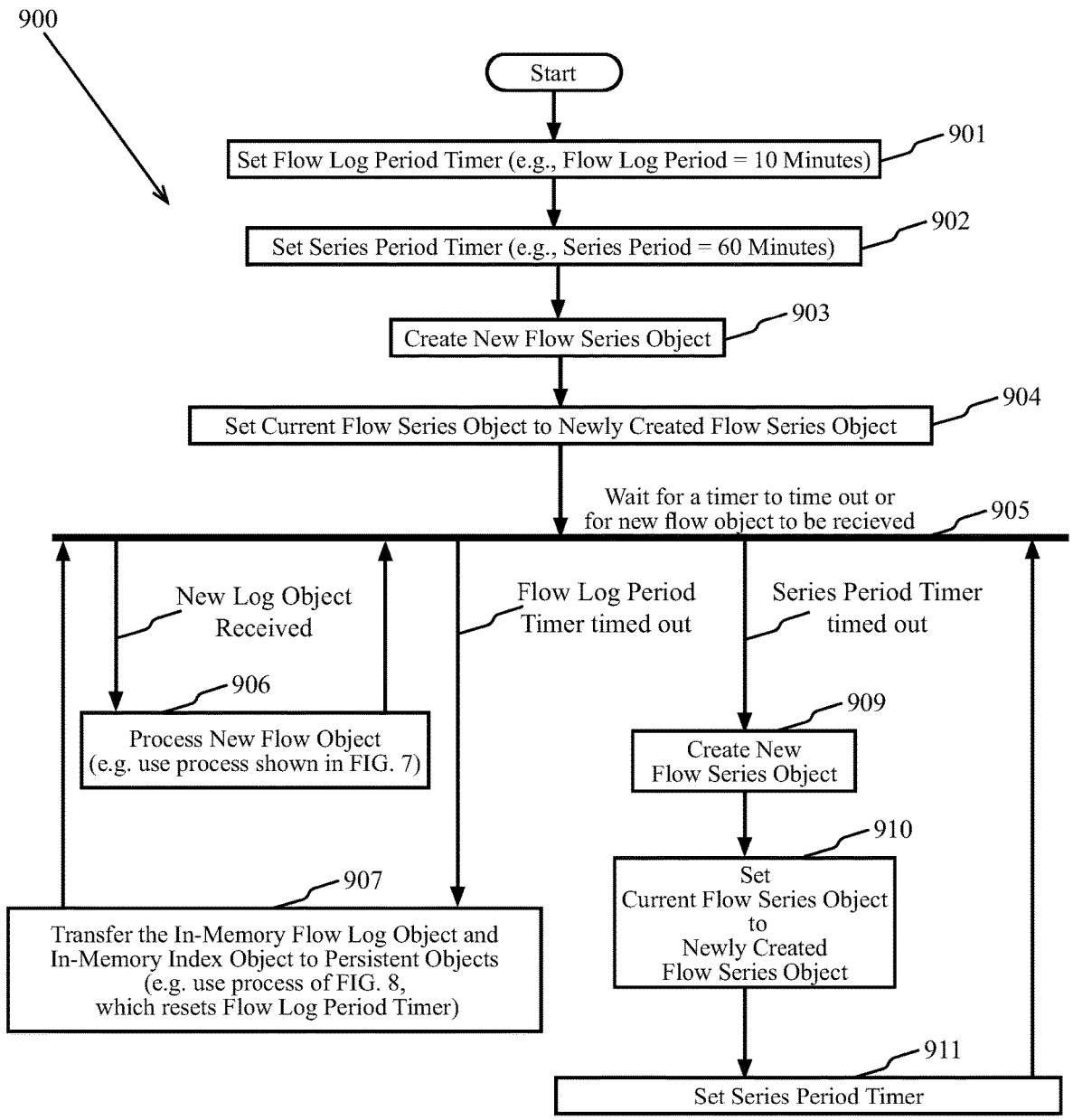
FIG. 9 is a high-level flow diagram illustrating a use of timers while producing index objects and flow log objects according to some aspects.

FIG. 9 is a high-level flow diagram illustrating a use of timers while producing index objects and flow log objects 900 according to some aspects. After the start, at block 901 the flow log period timer can be set to time out after a flow log period such as ten minutes. At block 902, a series period timer can be set to time out after a series period such as one hour. At block 903, a new flow series object can be created. At block 904, the current flow series object is set to the newly created flow series object. Data can be written into the current flow series object at block 810 of FIG. 8. The process can wait 905 for a timer to expire or for a new log object to be received. When a new log object is received then at block 906 the new log object can be processed. The process shown in FIG. 7 may process the new log object. When the flow log period timer times out, the process can proceed to block 907. At block 907, the in-memory index object and the in-memory flow log object can be transferred to persistent objects. The process illustrated in FIG. 8 may persist the in-memory objects. When the series period timer times out, the process may proceed to block 909. At block 909, a new flow series object is created. At block 910, the current flow series object is set to the newly created flow series object. At block 911, the series period timer is set to timeout after a series period. The process can return to waiting 905 after blocks 906, 907, and 911.

Figure 10:
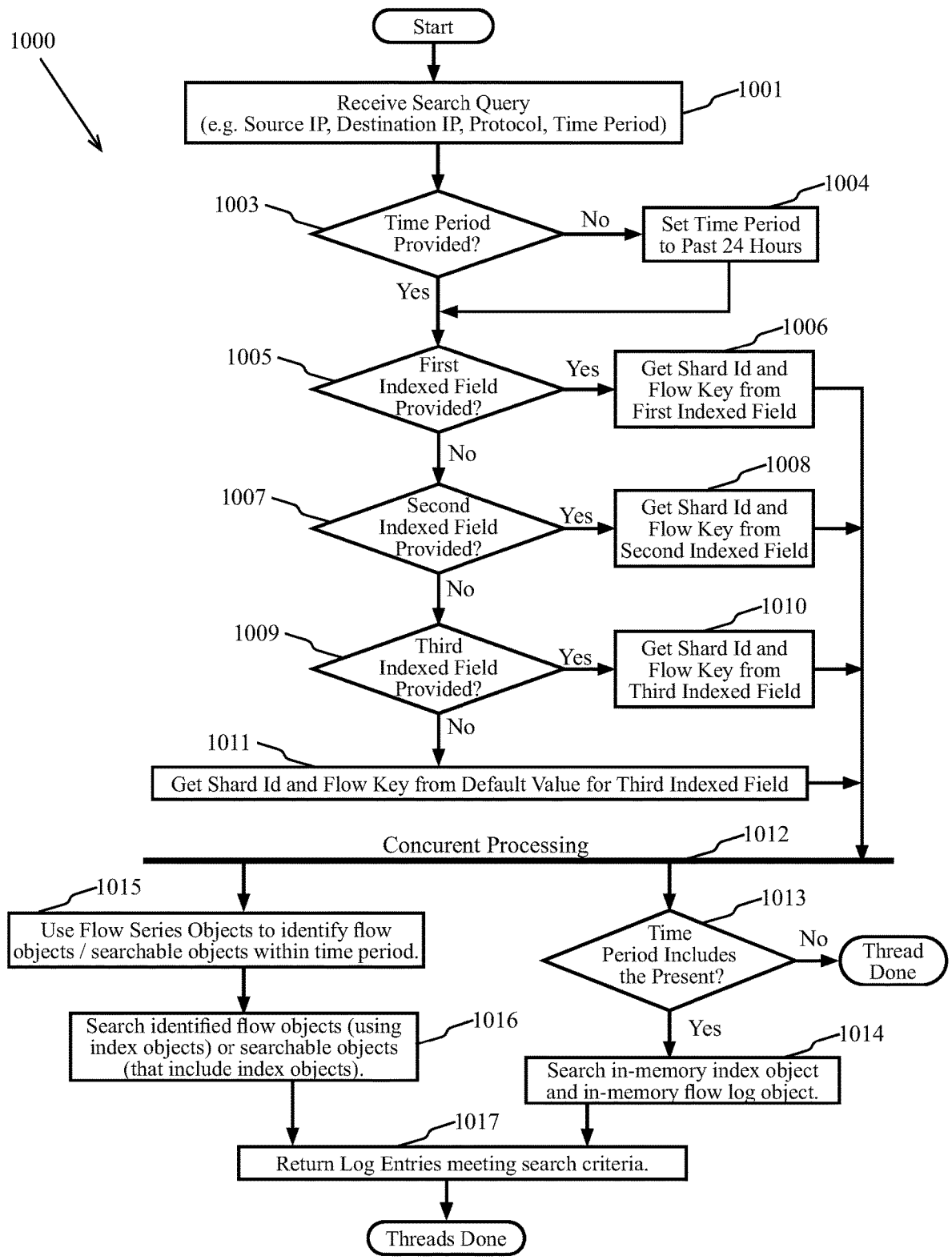
FIG. 10 is a high-level flow diagram illustrating the processing of a search query according to some aspects.

FIG. 10 is a high-level flow diagram illustrating the processing of a search query 1000 according to some aspects. At block 1001, a search query is received. The search query can include values for one or more of the indexed fields. At block 1003 the process can check if the search query specifies a time period. If so, the process proceeds directly to block 1005. Otherwise, at block 1004 the time period is set to a default time period (e.g., the last 24 hours) before the process proceeds to block 1005. At block 1005, the process determines if the search query includes a value for the first indexed field. If so, at block 1006 the value for the first indexed field is used to determine a shard identifier and a flow key before the process proceeds to concurrent processing 1012. Otherwise, the process proceeds to block 1007. At block 1007, the process determines if the search query includes a value for the second indexed field. If so, at block 1008 the value for the second indexed field is used to determine a shard identifier and a flow key before the process proceeds to concurrent processing 1012. Otherwise, the process proceeds to block 1009. At block 1009, the process determines if the search query includes a value for the third indexed field. If so, at block 1010 the value for the third indexed field is used to determine a shard identifier and a flow key before the process proceeds to concurrent processing 1012. Otherwise, the process proceeds to block 1011. At block 1011, a default value for the third indexed field is used to determine a shard identifier and a flow key before the process proceeds to concurrent processing 1012. Note that a default value can be used for any of the indexed fields at block 1011. Those practiced in computer programming can extend the example of FIG. 10 for an arbitrary number of indexed fields.

At concurrent processing 1012, the process can split into concurrent threads. One thread can proceed to block 1015. At block 1015, the flow series objects can be used to identify flow objects or internally indexed searchable objects having entries within the time period being searched. At block 1016, the identified flow objects or internally indexed searchable objects can be searched using the shard identifier and the flow key for log entries matching the search query. The threads can rendezvous at block 1017 where the log entries meeting the search criteria in the search query are returned. Returning to concurrent processing 1012, another thread can proceed to block 1013. At block 1013, the thread determines if the time period includes the present. If not, the thread can exit. Otherwise, at block 1014 the in-memory index object and the in-memory flow log object can be searched before the rendezvous at block 1017. If, at block 1015, numerous flow objects or internally indexed searchable objects are identified, then additional threads can be spawned to search them all concurrently.

Figure 11:
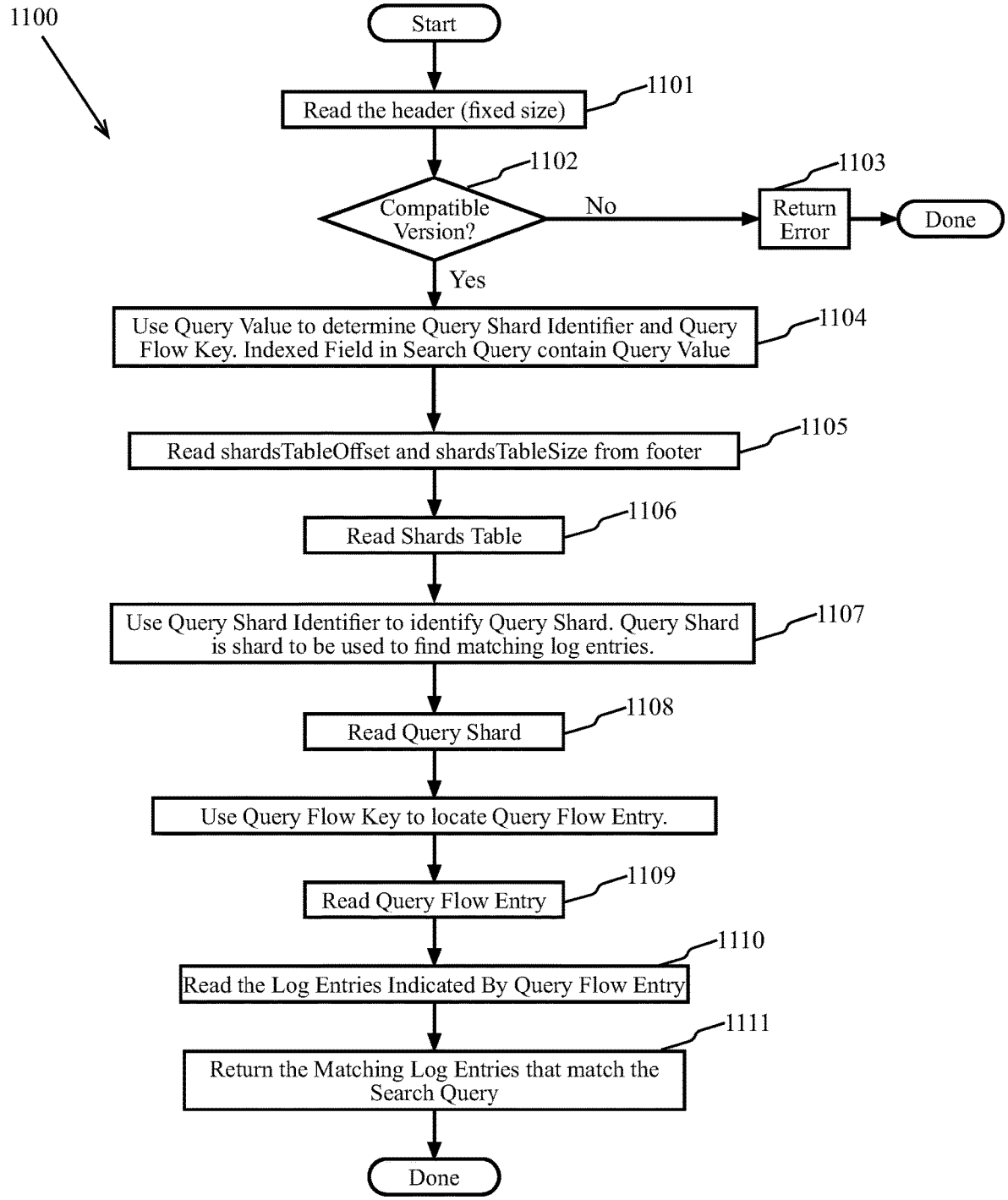
FIG. 11 is a high-level flow diagram illustrating using shard indenters and flow keys for searching an internally indexed searchable object according to some aspects.

FIG. 11 is a high-level flow diagram illustrating using shard identifiers and flow keys for searching an internally indexed searchable object 1100 according to some aspects. The flow file 501 illustrated in FIG. 5 is an example of an internally indexed searchable object. After the start, at block 1101 the header, which can be a fixed size, is read. At block 1102, the process can determine if the version of the internally indexed searchable object is compatible with the process. If not, at block 1103 an error is returned and the process exits. Otherwise, at block 1104 the query shard identifier and the query flow key are determined using the query value. The query value can be the value for an indexed field in a search query. At block 1105, the shards table offset and the shards table size can be read from the footer. At block 1106, the shards table offset and the shards table size are used to read the shards table. At block 1107, the query shard identifier identifies the query shard. The query shard is the shard that includes log entries that match the search query. At block 1108 the query shard is read. At block 1109, the query flow key is used to identify the query flow entry. The query flow entry is the flow entry indicating log entries that match the search query. At block 1110, the log entries indicated by the query flow entry are read. At block 1111, the matching log entries, which are the log entries matching the search query, can be returned.

Figure 12:
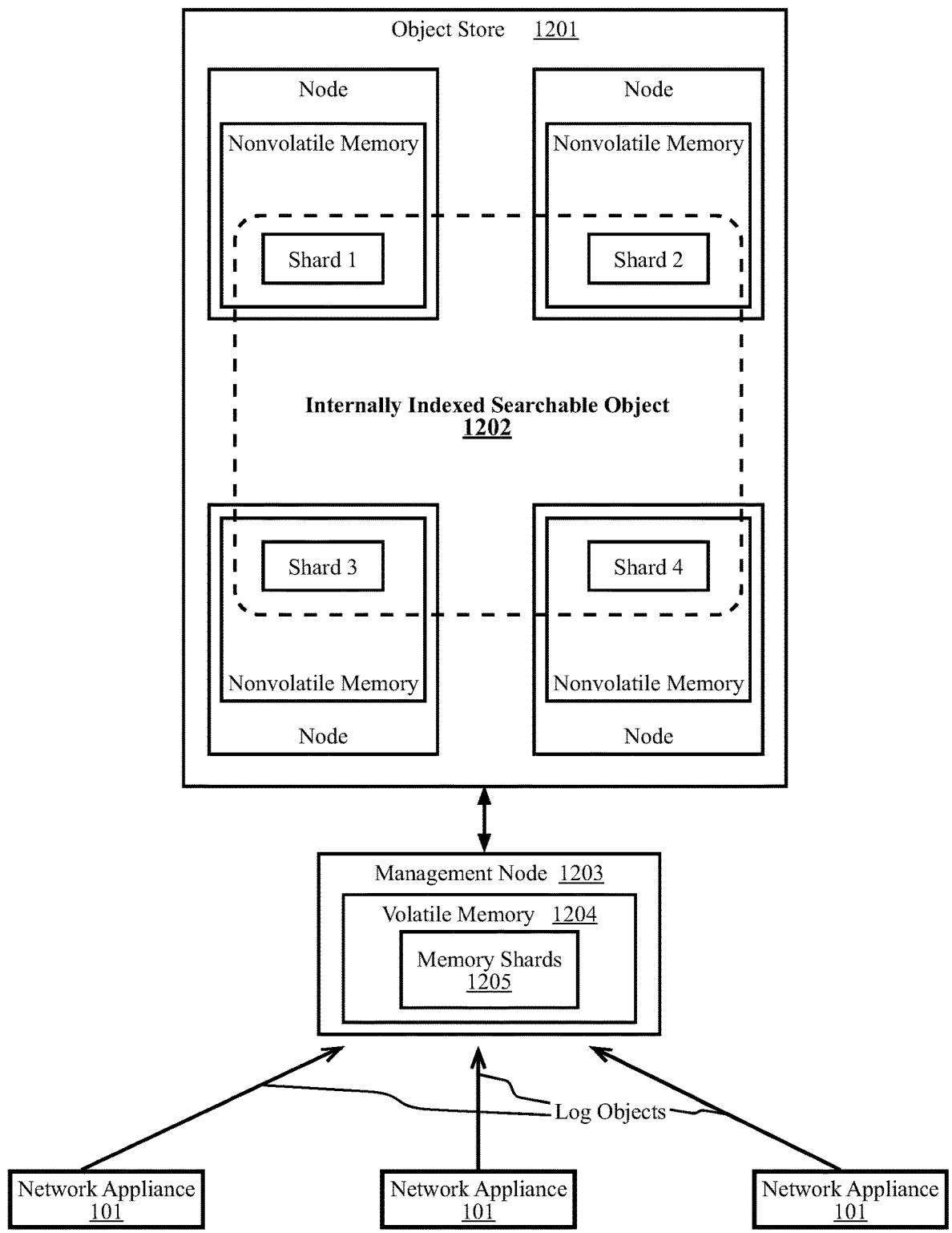
FIG. 12 is a high-level diagram illustrating an internally indexed searchable object stored by a distributed object store according to some aspects.

FIG. 12 is a high-level diagram illustrating an internally indexed searchable object 1202 stored by a distributed object store 1201 according to some aspects. Network appliances 101 can provide log objects to a management node 1203 that includes a volatile memory 1204 storing memory shards 1205. The management node 1203 can be one of the nodes participating in a distributed object store 1201. The management node 1203 can process the log objects to create in-memory flow log objects and in-memory index objects. The management node can also transfer the in-memory flow log objects and in-memory index objects to the persistent storage of the object store 1201. Numerous nodes can participate in the object store 1201. The object store can therefore be distributed across the participating nodes and can be stored as sharded data on the nodes. As such, the internally indexed searchable object 1202 can be replicated across the nodes.

Figure 13:
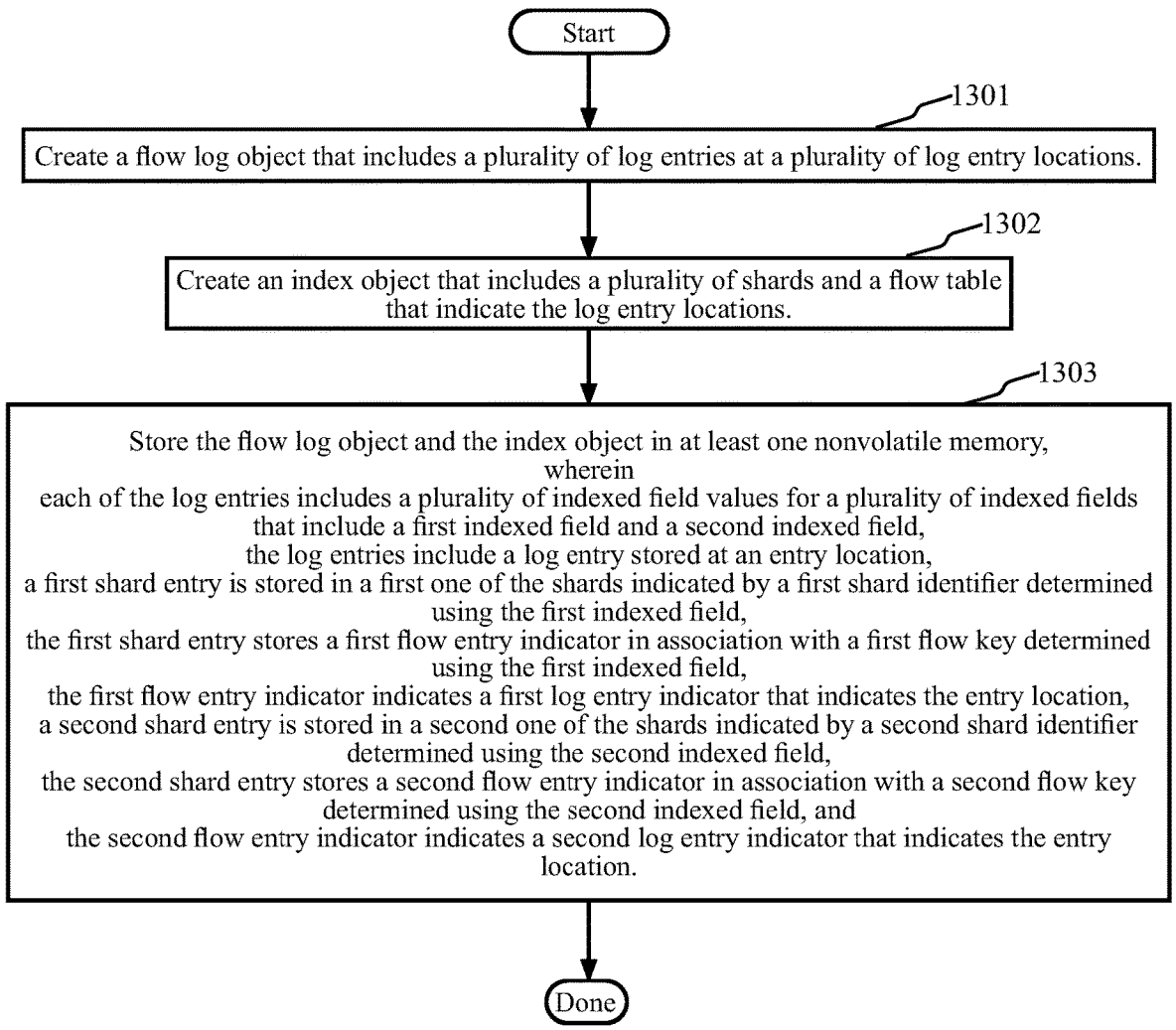
FIG. 13 illustrates a high-level flow diagram of a method for a network flow log according to some aspects.

FIG. 13 illustrates a high-level flow diagram of a method for a network flow log according to some aspects. At block 1301, the process can create a flow log object that includes a plurality of log entries at a plurality of log entry locations. At block 1302, the process can create an index object that includes a plurality of shards and a flow table that indicate the log entry locations. At block 1303, the process can store the flow log object and the index object in at least one nonvolatile memory, wherein each of the log entries includes a plurality of indexed field values for a plurality of indexed fields that include a first indexed field and a second indexed field, the log entries include a log entry stored at an entry location, a first shard entry is stored in a first one of the shards indicated by a first shard identifier determined using the first indexed field, the first shard entry stores a first flow entry indicator in association with a first flow key determined using the first indexed field, the first flow entry indicator indicates a first log entry indicator that indicates the entry location, a second shard entry is stored in a second one of the shards indicated by a second shard identifier determined using the second indexed field, the second shard entry stores a second flow entry indicator in association with a second flow key determined using the second indexed field, and the second flow entry indicator indicates a second log entry indicator that indicates the entry location.

Aspects described above can be ultimately implemented in a network appliance that includes physical circuits that implement digital data processing, storage, and communications. The network appliance can include processing circuits, ROM, RAM, CAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). The network appliance may be embodied as a single IC device (e.g., fabricated on a single substrate) or the network appliance may be embodied as a system that includes multiple IC devices connected by, for example, a printed circuit board (PCB). The interfaces may include network interfaces (e.g., Ethernet interfaces and/or InfiniB and interfaces) and/or PCI Express (PCIe) interfaces. The interfaces may also include other management and control interfaces such as I2C, general purpose IOs, USB, UART, SPI, and eMMC.

As used herein the terms "packet" and "frame" may be used interchangeably to refer to a protocol data unit (PDU) that includes a header portion and a payload portion and that is communicated via a network protocol or protocols. A PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method comprising:
creating a flow log object that includes a plurality of log entries at a plurality of log entry locations;
creating an index object that includes a plurality of shards and a flow table that indicate the log entry locations; and
storing the flow log object and the index object in at least one nonvolatile memory,
wherein
each of the log entries includes a plurality of indexed field values for a plurality of indexed fields that include a first indexed field and a second indexed field,
the log entries include a log entry stored at an entry location,
a first shard entry is stored in a first one of the shards indicated by a first shard identifier determined using the first indexed field,
the first shard entry stores a first flow entry indicator in association with a first flow key determined using the first indexed field,
the first flow entry indicator indicates a first log entry indicator that indicates the entry location,
a second shard entry is stored in a second one of the shards indicated by a second shard identifier determined using the second indexed field,
the second shard entry stores a second flow entry indicator in association with a second flow key determined using the second indexed field, and
the second flow entry indicator indicates a second log entry indicator that indicates the entry location.

2. The method of claim 1 wherein the flow log object and the index object are included in a searchable object that is internally indexed and that is stored in the at least one nonvolatile memory.

3. The method of claim 2, wherein the searchable object is stored in a file wherein a flow log footer is stored after the index object which is stored after the flow log object, which is stored after a flow log header.

4. The method of claim 3 wherein the flow table includes a plurality of log entry indicators that contain log entry offsets and log entry sizes that indicate the log entry locations within the file.

5. The method of claim 1 wherein:
the index object includes a shards table that includes a plurality of shard table entries;
the shards table entries associate a plurality of shard identifiers with a plurality of shard indicators; and
each of the shard indicators indicate a shard location and a shard length.

6. The method of claim 1 wherein the shards stored in the at least one nonvolatile memory are concurrently searchable.

7. The method of claim 1 further including:
receiving a plurality of log objects that contain the log entries;
storing the log entries into a memory flow log object at a plurality of memory locations;
storing a plurality of memory flow entry indicators in a plurality of memory shards;
transferring the log entries from the memory flow log object into the flow log object; and
transferring the memory shards into the shards.

8. The method of claim 7, wherein the memory shards are stored in a volatile memory.

9. The method of claim 8 wherein the shards stored in the at least one nonvolatile memory and the memory shards are concurrently searchable.

10. The method of claim 7 wherein:
an object store receives the log objects from a plurality of network appliances;
the log entries are records of a plurality of network traffic flows processed by the network appliances;
receiving one of the log objects triggers an intake process;
the intake process stores the log entries in the memory flow log object;
the intake process stores the memory flow entry indicators in the memory shards; and
the flow log object is produced from log entries received during a predefined time period or from a predetermined number of log entries received during the predefined time period.

11. The method of claim 7 further including:
receiving a query request that includes a query value for one of the indexed fields;
using the query value to identify a query memory shard and a query shard;
determining a query flow key from the query value;
using the query flow key to search the query shard and the query memory shard for the log entries matching the query request; and
returning a query response that includes a matching log entry.

12. The method of claim 1 wherein:
a plurality of flow log objects are sequentially produced during a plurality of flow log periods;
a series object is associated with one of a plurality of sequentially occurring series periods;

the series object includes a plurality of flow log indicators that indicate the flow log objects produced during the one of the series periods;

the flow log object is one of the flow log objects produced during the one of the series periods; and the series object is one of a plurality of series objects uniquely associated with the series periods.

13. A system comprising:

a nonvolatile memory; and an object store, wherein the object store is configured to store a flow log object and an index object in the nonvolatile memory, the flow log object includes a plurality of log entries at a plurality of log entry locations, the index object includes a plurality of shards and a flow table that indicate the log entry locations, each of the log entries includes a plurality of indexed field values for a plurality of indexed fields that include a first indexed field and a second indexed field, the log entries include a log entry stored at an entry location, a first shard entry is stored in a first one of the shards indicated by a first shard identifier determined using the first indexed field, the first shard entry stores a first flow entry indicator in association with a first flow key determined using the first indexed field, the first flow entry indicator indicates a first log entry indicator that indicates the entry location, a second shard entry is stored in a second one of the shards indicated by a second shard identifier determined using the second indexed field, the second shard entry stores a second flow entry indicator in association with a second flow key determined using the second indexed field, and the second flow entry indicator indicates a second log entry indicator that indicates the entry location.

14. The system of claim 13 wherein:

the flow log object and the index object are included in a searchable object that is internally indexed and that is stored in the nonvolatile memory;

the searchable object is stored in a file wherein a flow log footer is stored after the index object which is stored after the flow log object, which is stored after a flow log header; and the flow table includes a plurality of log entry indicators that contain log entry offsets and log entry sizes that indicate the log entry locations within the file.

15. The system of claim 13 wherein:

the index object includes a shards table that includes a plurality of shard table entries;

the shards table entries associate a plurality of shard identifiers with a plurality of shard indicators;

each of the shard indicators indicate a shard location and a shard length; and the shards are concurrently searchable.

16. The system of claim 13, wherein:

the system is configured for receiving a plurality of log objects that contain the log entries;

the system is configured for storing the log entries into a memory flow log object at a plurality of memory locations;

the system is configured for storing a plurality of memory flow entry indicators in a plurality of memory shards;

the system is configured for transferring the log entries from the memory flow log object into the flow log object; and the system is configured for transferring the memory shards into the shards.

17. The system of claim 16 wherein:

the object store receives the log objects from a plurality of network appliances;

the log entries are records of a plurality of network traffic flows processed by the network appliances;

receiving one of the log objects triggers an intake process;

the intake process stores the log entries in the memory flow log object;

the intake process stores the memory flow entry indicators in the memory shards; and the flow log object is produced from log entries received during a predefined time period or from a predetermined number of log entries received during the predefined time period.

18. The system of claim 13 wherein:

a plurality of flow log objects are sequentially produced during a plurality of flow log periods;

a series object is associated with a series period that is one of a plurality of sequentially occurring series periods;

the series object includes a plurality of flow log indicators that indicate the flow log objects produced during the series period;

the flow log object is one of the flow log objects produced during the series period; and the series object is one of a plurality of series objects uniquely associated with the series periods.

19. A system comprising:

a flow log means storing a plurality of flow log entries;

an indexing means configured for locating the flow log entries in the flow log means;

an internally indexed means that includes the indexing means and the flow log entries; and and a means for sharding within the indexing means.

20. The system of claim 19 further comprising a series means associating the flow log means and the indexing means with a time period.

* * * * *